Sept. 26, 1967  T. K. HUTCHINSON ET AL  3,344,327
TWO SPEED MOTOR CONTROL CIRCUIT WITH BRAKE
Filed Jan. 7, 1955
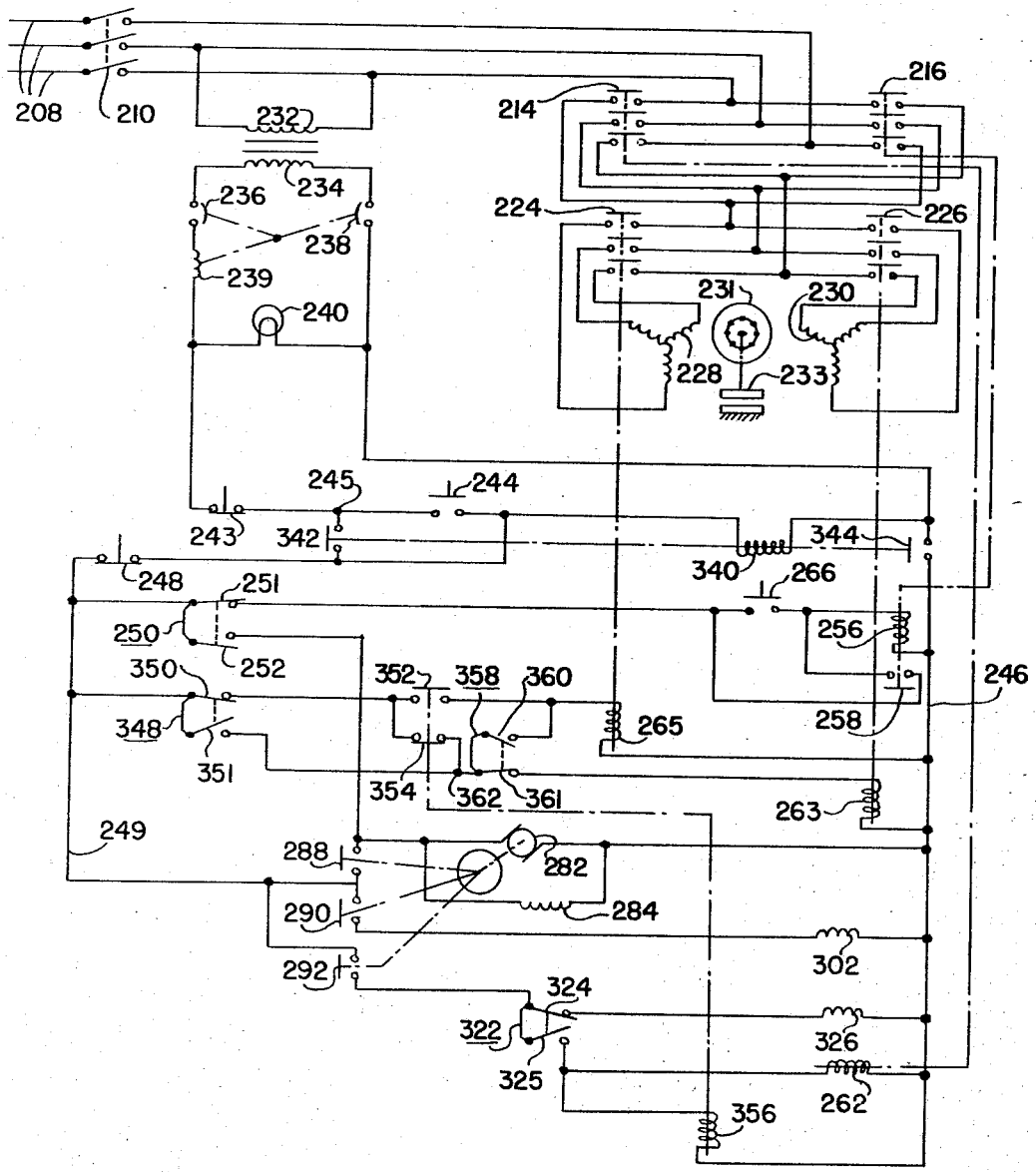
FIG. I
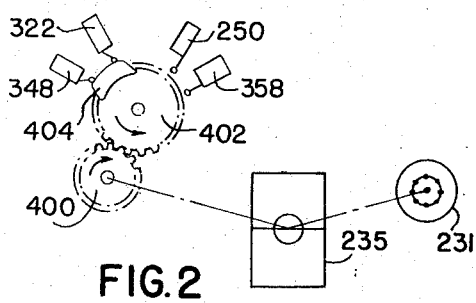
FIG. 2
INVENTORS
THOMAS K. HUTCHINSON
OLIVER C. KEMP HUTCHINSON
BY Woodling, Krost,
Granger and Rust
ATTORNEYS United States Patent Office 3,344,327
Patented Sept. 26, 1967

3,344,327
TWO-SPEED MOTOR CONTROL CIRCUIT WITH BRAKE
Thomas K. Hutchinson and Oliver C. Kemp Hutchinson, Alton, Ill., assignors to The National Acme Company, a corporation of Ohio
Filed Jan. 7, 1965, Ser. No. 424,008
6 Claims. (Cl. 318—258)

ABSTRACT OF THE DISCLOSURE

The invention discloses a load driven from a two speed reversible motor. The load moves along a path at high speed from an initial position toward a second position and is slowed to a low speed so that it may be stopped precisely at the second position by a brake. Next the motor is reversed, driving the load in reverse direction along the path at high speed, then slowing to low speed so that it may be stopped precisely at the initial position by the brake.

This invention relates to improvements in motor control circuits. More particularly, this invention relates to improvements in circuits for molding machines that can be used to form shell molds.

It is, therefore, an object of the present invention to provide an improved molding machine that can be used to form shell molds.

Letters Patent No. 2,931,080 for Molding Machines which was granted to us on Apr. 5, 1960 discloses a rotatable pattern-supporting frame and a movable investment box that are selectively moved into engagement with each other and are then rotated together. In its normal position, the pattern-supporting frame is horizontal and holds a heated pattern at the upper face thereof; and in its normal position, the investment box has its open end at the top thereof. After the pattern-supporting frame and investment box have been moved into engagement with each other and have then been rotated together, the pattern-supporting frame will again be horizontal and will again have the heated pattern at the upper face thereof, and the investment box will have its open end at the bottom thereof. At such time, the admixed sand and binder will fall from the investment box and will come to rest upon the heated pattern to form an uncured shell mold. Subsequently, the pattern-supporting frame and the investment box will be rotated in the opposite direction, and will then be moved apart. At such time, the pattern-supporting frame and the investment box will be back in their normal positions once again. An oven, of the type disclosed in Letters Patents No. 2,899,723 for Shell Molding Machine which was granted to us on Aug. 18, 1959, will then be moved into position adjacent the uncured shell mold to heat and thereby cure that shell mold. At the conclusion of the curing step, the oven will be moved away from the shell mold, and that shell mold will be stripped from the heated pattern.

As pointed out in said Letters Patent No. 2,931,080, the rotation of the pattern-supporting frame and of the investment box must be rapid, and the rotation of that pattern-supporting frame and of that investment box must be halted quickly. Where the said molding machines are of small or moderate size, the motors of those machines can quickly halt the rotation of the pattern-supporting frames, and can halt that rotation when those pattern-supporting frames are in their initial positions. However, where those molding machines are quite large, variations in the braking forces applied by the magnetic brakes of the motors of those molding machines can coact with the rapid movement of the pattern-supporting frames and of the investment boxes to cause those pattern-supporting frames to rotate beyond, or to stop short of, their initial positions. Any variances between the final positions and the initial position of the pattern-supporting frame of a large molding machine are objectionable, because such variances can make it difficult or even impossible to use a power-operated device to lift the cured shell molds from the heated pattern carried by the pattern-supporting frame. As a result, it would be desirable to provide a molding machine which would halt the pattern-supporting frame thereof in its initial position at the end of each cycle of operation of that molding machine. The present invention provides such a molding machine; and it is therefore an object of the present invention to provide a molding machine that can halt the rotation of the pattern-supporting frame thereof in its initial position at the end of each cycle of operation of that molding machine.

The present invention makes it possible to halt the pattern-supporting frame of the molding machine in its initial position at the end of each cycle of operation of that molding machine by providing a two-speed motor and by causing that motor to rotate that pattern-supporting frame at low speed as that pattern-supporting frame approaches its initial position at the end of each cycle of operation of that molding machine. Because the investment box and the pattern-supporting frame of the molding machine will be moving at low speed as that pattern-supporting frame approaches its initial position at the end of each cycle of operation of that molding machine, the variations in the braking forces applied by the magnetic brakes of the motor will be unable to cause the pattern-supporting frame to move beyond, or to stop short of, its initial position. Yet, that motor will rotate that pattern-supporting frame and that investment box at high speed during the critical period when that investment box is being rotated from its normal to its inverted position. In this way, the present invention provides the centrifugal forces that are needed to hold the admixed sand and binder adjacent the closed end of the investment box as that investment box is rotated from its normal to its inverted position, and yet keeps the pattern-supporting frame from rotating beyond, or stopping short of, its initial position. It is therefore an object of the present invention to provide a molding machine with a two-speed motor which rotates the pattern-supporting frame of that machine at a high rate of speed as the investment box of that machine is rotated from its normal to its inverted position and which rotates that pattern-supporting frame at a low rate of speed as that pattern-supporting frame approaches its initial position at the end of each cycle of operation of that machine.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

In the drawing, FIGURE 1 is a schematic diagram of a simplified electrical circuit for a molding machine as one example of a load that is made in accordance with the principles and teachings of the present invention, and FIGURE 2 is a schematic view of four limit switches and of a pair of gears that rotate when the pattern-supporting frame of the molding machine rotates.

Referring to the drawing in detail, the numeral 208 denotes three leads which can be connected to a suitable source of power. One suitable source of power is a source of four hundred and forty-volt, three-phase, alternating current.

A three pole, single throw, manually-operated disconnect switch 210 has one set of the fixed contact thereof connected to the leads 208. Two of the fixed contacts of the other set of fixed contacts of the switch 210 are connected to the terminals of the primary winding 232 of a step-down transformer. The numerals 214 and 216 denote the contacts of a magnetic reversing switch; and whenever the contacts 214 are closed the contacts 216 will be open, and vice versa. The contacts 216 will be closed and the contacts 214 will be open whenever "forward" coil 256 is energized; and the contacts 214 will be closed and the contacts 216 will be open whenever "reverse" coil 262 is energized. One type of magnetic reversing switch that can be used is switch No. 705 BOD of the Allen Bradley Company.

The numerals 224 and 226 denote the contacts of a magnetic selector switch; and whenever the contacts 224 are closed the contacts 226 will be open, and vice versa. The contacts 224 will be closed and the contacts 226 will be open whenever "low speed" coil 265 is energized; and the contacts 226 will be closed and the contacts 224 will be open whenever "high speed" coil 263 is energized. One type of magnetic selector switch that can be used is switch No. 715 BOD 11 of the Allen Bradley Company.

The three fixed contacts of the switch 210 are connected directly to the upper contacts of the contacts 214 and 216. The lower contacts of the contacts 214 and 216 are connected directly to the upper contacts of the contacts 224 and 226. The lower contacts of the contacts 224 are connected to the low speed winding 228 of the motor 231 that rotates the load or pattern-supporting frame 235 of the molding machine provided by the present invention. The lower contacts of the contacts 226 are connected to the high speed winding 230 of motor 231. The low speed winding 228 may rotate the shaft of the motor at three hundred and forty revolutions per minute, for example, and the high speed winding 230 may rotate that shaft at ten hundred and eighty revolutions per minute. The said motor is equipped with means, which may be the windings 228 and 230 themselves, that pulls a magnetic brake 233 out of braking position whenever either of the windings 228 or 230 is energized. The brake 233 will, however, move into braking position and promptly halt rotation of the motor and load as soon as the windings 228 and 230 are de-energized. This motor and brake may be of the type shown in Patent No. 1,501,497, issued to E. H. Schwarz on July 15, 1924.

Whenever the switch 210 is closed and the contacts 216 and 226 are closed, the winding 230 will rotate the pattern-supporting frame in the forward direction at high speed; and whenever the switch 210 is closed and the contacts 216 and 224 are closed, the winding 228 will rotate the pattern-supporting frame in the forward direction at low speed. Whenever the switch 210 is closed and the contacts 214 and 226 are closed, the winding 230 will rotate that pattern-supporting frame in the reverse direction at high speed; and whenever the switch 210 is closed and the contacts 214 and 224 are closed, the winding 228 will rotate that pattern-supporting frame in the reverse direction at low speed.

The numeral 234 denotes the secondary winding of the step-down transformer, and that winding will normally develop a suitable control voltage, such as one hundred fifteen volts. Normally-closed sets of contacts 236 and 238 of an overload protective device 239 are connected to the terminals of the secondary winding 234; and those sets of contacts will be closed under all normal operating conditions. However, the sets of contacts 236 and 238 will open in the event a potentially-hurtful overload continues for a predetermined length of time.

An indicating lamp 240 is connected to the lower contacts of the sets of contacts 236 and 238; and that lamp will indicate when the switch 210 is closed and the sets of contacts 236 and 238 are closed. That lamp will be suitably mounted at the exterior of the molding machine which utilizes the circuit shown in FIGURE 1.

The numeral 243 denotes a normally-closed stop push button that has one of the fixed contacts thereof connected to the lower contact of the set of contacts 236. The other fixed contact of the push button 243 is connected to one contact of a normally-open start push button 244 by a junction 245. The other contact of the push button 244 is connected through a start relay coil 340 to the lower contact of the set of contacts 238. That coil will respond to energization thereof to close normally-open contacts 342 and 344—the contacts 342 being adjacent the junction 245 and the contacts 344 being adjacent the right-hand terminal of the relay coil 340 to energize a conductor 246. The push button 243 and the contacts 342 complete a holding circuit for the relay coil 340; and hence as long as the push button 243 remains closed, the relay coil 340 will keep the contacts 342 and 344 closed.

The numeral 248 denotes a normally-closed re-set switch which can be used to effect de-energization of certain components of the circuit connected to a common conductor 249 shown in FIGURE 1. That re-set switch will be suitably located at the exterior of the molding machine.

A limit switch 250 has the movable contacts 251 and 252 thereof connected to the common conductor 249. That limit switch is made so the contact 252 is open whenever the contact 251 is closed and so the contact 252 is closed whenever the contact 251 is open. The contact 251 will be closed and the contatct 252 will be open whenever the pattern-supporting frame is in its initial position; but the contact 251 will be opened and the contact 252 will be closed as the investment box moves into its fully inverted position. The contact 251 will remain open and the contact 252 will remain closed until shortly after the investment box starts moving out of its fully inverted position.

The movable contact 251 of the limit switch 250 is connectable to the "forward" coil 256 by a normally-open cycle start push button 266 or by the normally-open contacts 258 of that "forward" coil. The push button 266 is used to initiate cycles of operation of the molding machine, and the contacts 258 are used to provide a holding circuit for the "forward" coil 256. The push button 266 will be suitably mounted at the exterior of the molding machine.

The contact 252 of the limit switch 250 will, whenever it is closed, be connected to the motor 282 of a timer for the molding machine provided by the present invention. While different timers could be used, the Multiflex Reset Timer made by the Eagle Signal Corporation has been found to be useful. That timer has a clutch, and the coil which controls that clutch is denoted by the numeral 284 and is connected in parallel with the motor 282. As a result, whenever the contact 252 of limit switch 250 is closed, the motor 282 and the clutch coil 284 of the timer will be energized.

A limit switch 348 has the movable contacts 350 and 351 thereof connected to the common conductor 249. That limit switch is made so the contact 351 is open whenever the contact 350 is closed and so the contact 351 is closed whenever the contact 350 is open. The contact 350 will be closed and the contact 351 will be open whenever the pattern-supporting frame is in its initial position; but the contact 350 will be opened and the contact 351 will be closed shortly after the pattern-supporting frame starts to move out of its initial position. The contact 350 will remain open and the contact 351 will remain closed until shortly before that pattern-supporting frame returns to its initial position.

The contact 350 of the limit switch 348 is connectable to the low speed coil 265 by normally-open contacts 352. The contact 350 is normally connected to a junction 362 by normally-closed contacts 354. The contact 351 of the limit switch 348 will be connected to the junction 362 whenever that contact is closed. As indicated previously, the relay coil 265 controls the contacts 224 which are connected to the low speed winding 228. The contacts 352 and 354 are controlled by a coil 356 which is shown adjacent the bottom of FIGURE 1. As long as the coil 356 is in its normal de-energized condition, the contacts 352 will remain open and the contacts 354 will remain closed. However, as soon as the coil 356 is energized, the contacts 352 will close and the contacts 354 will open.

A limit switch 358 has the movable contacts 360 and 361 thereof connected to the junction 362. That limit switch is made so the contact 360 is open whenever the contact 361 is closed and so the contact 360 is closed whenever the contact 361 is open. The contact 361 will be closed and the contact 360 will be open whenever the pattern-supporting frame is in its initial position; but the contact 361 will be opened and the contact 360 will be closed shortly before the contact 251 is opened and the contact 252 is closed. The contact 360 will remain closed and the contact 361 will remain open as long as the investment box remains in its fully inverted position. The contact 360 will re-open and the contact 361 will re-close shortly after the contact 251 re-closes and the contact 252 re-opens.

The contact 360 of the limit switch 358 is normally disconnected from the coil 265, but that contact will be connected to that coil whenever that contact is closed. The contact 361 is normally connected to the coil 263, but that contact can be opened to disconnect it from that coil. As indicated previously, the coil 263 controls the contacts 226 which are connected to the high speed winding 230.

A limit switch 322 has the movable contacts 324 and 325 thereof connectable to the common conductor 249 by the normally-open contacts 292 of the timer. The limit switch 322 is made so the contact 325 is open whenever the contact 324 is closed and so the contact 325 is closed whenever the contact 324 is open. The contact 324 will be closed and the contact 325 will be open whenever the pattern-supporting frame is in its initial position; but the contact 324 will be opened and the contact 325 will be closed as soon as the pattern-supporting frame moves out of its initial position. The contact 324 will remain open and the contact 325 will remain closed until shortly after the contact 350 re-closes.

The contact 324 is normally connected to the left-hand terminal of the solenoid 326 of a solenoid-operated air valve, but that contact will be disconnected from that terminal when that contact is opened. The contact 325 is normally disconnected from the parallel-connected coils 262 and 356, but that contact will be connected to those coils when that contact is closed.

The timer 282 has a pair of normally-open contacts 288 and a pair of normally-open contacts 290 in addition to the pair of normally-open contacts 292. One contact of each of those pairs of normally-open contacts is connected to the common conductor 249. The other contact of the pair of contacts 288 is connected to the left-hand terminal of the motor 282 and to the left-hand terminal of the clutch coil 284. The other contact of the pair of contacts 290 is connected to the left-hand terminal of the coil 302 of a vibrator. That vibrator is mounted on the pattern-supporting frame and helps the admixed sand and binder conform closely to the pattern.

A spur gear 400 is connected to the pattern-supporting frame 235 of the molding machine provided by the present invention, and that gear drives a second gear 402. That second gear will rotate about two hundred eighty degrees while that pattern-supporting frame is rotating three hundred sixty degrees. A cam 404 is mounted on the gear 402, and the actuators of the limit switches 322, 348, 358, and 250 will lie in the path of movement of that cam. As a result, rotation of the gears 400 and 402 will enable the cam 404 to actuate the various limit switches.

OPERATION

When the molding machine of the present invention is at rest, the electrical components of that machine will be in the positions indicated by FIGURE 1. In preparing to use that machine the operator will close the disconnect switch 210; and if the indicating lamp 240 becomes illuminated, the operator will know that the switch 210, the primary winding 232, the secondary winding 234, and the contacts 236 and 238 are in good order. The operator will then press start push button 244, thereby energizing the start relay coil 340. Thereupon, contacts 342 and 344 will close; and those contacts will remain closed as long as the stop push button 243 is not disturbed. That push button 243 can be opened by the operator if he ever wishes to effect prompt de-energization of the various components of the circuit of FIGURE 1. At the time the contacts 342 and 344 close, conductors 246 and 249 are energized to energize the high speed relay coil 263 through limit switch contact 350 and limit switch contact 361. The resulting energization of the coil 263 will close the contacts 226; but the high speed motor winding 230 will not become energized at that time because the contacts 214 and 216 are both open.

To start a cycle of operation of the molding machine provided by the present invention, the operator will press the cycle start push button 266 and thereupon the "forward" coil 256 will be energized from conductors 249 and 246. This will close the contacts 216 and the contacts 258. The closing of the contacts 258 will keep the coil 256 energized after the push button 266 is released; and the closing of the contacts 216 will cause the motor winding 230 to start rotating the pattern-supporting frame in the forward or first direction at high speed. As that pattern-supporting frame so rotates, the gear 400 will rotate in the clockwise direction and will drive the gear 402 in the counter-clockwise direction. Almost immediately, the cam 404 will move out of engagement with the actuator of the limit switch 322; and thereupon the limit switch contact 325 will close and the limit switch contact 324 will open. This shifting of those contacts is not significant at this time because the timer contacts 292 are still open. After the gear 402 has rotated about twenty-seven degrees in the counter-clockwise direction, as an example, the cam 404 will move out of engagement with the actuator of the limit switch 348; and thereupon limit switch contact 351 will close and limit switch contact 350 will open. This shifting of the contacts of limit switch 348 will not have any immediate effect because the contact 351 will keep the coil 263 energized.

After the gear 402 has rotated a further two hundred and twenty-six degrees in the counter clockwise direction, and has thus rotated a total of two hundred fifty-three degrees in that direction, the cam 404 will engage the actuator of the limit switch 358. Thereupon the limit switch contact 360 will close and the limit switch contact 361 will open. The opening of contact 361 will de-energize the coil 263 and cause the contacts 226 to open and thereby de-energize the high speed winding 230. The closing of the contact 360 will energize the coil 265 and close the contacts 224; and thereupon the low speed winding 228 will become energized. Because the coil 256 is still energized, the contacts 216 will remain closed; and hence the pattern-supporting frame 235 will continue to rotate in the forward direction. However, that pattern-supporting frame will experience a severe and abrupt reduction in speed, because the motor speed will drop abruptly from ten hundred eighty revolutions per minute to three hundred forty revolutions per minute.

As the gear 402 approaches the end of its two hundred eighty degrees of rotation in the counter-clockwise direction, the cam 404 will engage the actuator of the limit switch 250. Thereupon the limit switch contact 251 will open and the limit switch contact 252 will close. The opening of the contact 251 will de-energize the coil 256; and thereupon the contacts 258 will re-open to break the holding circuit of that coil, and the contacts 216 will re-open to de-energize the low speed winding 228. As a result, the pattern-supporting frame will be braked to rest by the magnetic brake 233 in the rotated or second position.

The closing of the contact 252 will energize the timer motor 282 and the timer clutch winding 284 from conductors 249 and 246 and this will immediately close timer contacts 288 and 290. Timer contacts 288 will establish an alternate circuit for the parallel-connected motor 282 and winding 284 that is independent of the limit switch contact 252. The timer contact 290 will energize the coil 302 of the vibrator from common conductors 249 and 246. The resulting energization of that coil will enable the vibrator to vibrate the pattern and thereby cause the admixed sand and binder to conform closely to the surface of the heated pattern. The timer contacts 288 will remain closed long enough to enable all of the various operations of the molding machine to be completed. The timer contacts 290 will, however, remain closed for just a few seconds, as for example four seconds, and will then re-open; thereby providing a short period of vibration for the pattern.

The timer contacts 292 will not close when the contacts 288 and 290 close. Instead, those contacts will remain open for a long enough period of time, as for example ten seconds, to enable the heat from the heated pattern to soften enough for the binder in the admixed sand and binder to form an uncured shell mold. That shell mold will be sufficiently strong to retain its form and to adhere to the heated pattern as the pattern-supporting frame rotates in the reverse or second direction. That rotation will start when the timer contacts 292 do close; because those contacts will complete a circuit through the now-closed limit switch contact 325 and the "reverse" coil 262 between conductors 249 and 246. The resulting energization of coil 262 will close the contacts 214; and thereupon the low speed winding 228 will start rotating the pattern-supporting frame in the reverse direction at low speed. At the time the coil 262 becomes energized, the coil 356 also becomes energized; and the energization of the latter coil will close the contacts 352 while opening the contacts 354. This shifting of the contacts 352 and 354 will not have any effect at this time, because the contact 350 is open.

Almost immediately after the pattern-supporting frame starts rotating in the reverse direction, the cam 404 will move out of engagement with the actuator of the limit switch 250. Thereupon the contact 252 will re-open and the contact 251 will re-close. The re-opening of the contact 252 will not de-energize the timer motor 282 or the clutch winding 284 because the contacts 288 will keep that motor and that winding energized. The re-closing of the contact 251 will not re-energize the "forward" coil 256 because the push button 266 and the contacts 258 are open.

After the gear 402 has rotated about twenty-seven degrees in the clockwise direction, the actuator 404 will move out of engagement with the actuator of the limit switch 358, thereby causing the contact 361 to re-close and causing the contact 360 to re-open. The re-opening of the contact 360 will de-energize the coil 265, and thus open the contacts 224 and de-energize the low speed winding 228. The re-closing of the contact 361 will re-energize the coil 263, and thus close the contacts 226 and re-energize the high speed winding 230. As a result, the pattern-supporting frame will rotate at high speed in the reverse direction.

That pattern-supporting frame will continue to rotate at high speed in the reverse direction until the cam 404 is about twenty-seven degrees from its initial position; and then that cam will engage the actuator of limit switch 348. That engagement will re-open the contact 351 and de-energize the coil 263, with consequent opening of contacts 226 and de-energization of the high speed winding 230. That engagement of cam 404 with the actuator of limit switch 348 also will re-close the contact 350 and re-energize the coil 265 via now-closed contacts 352. The resulting energization of the coil 265 will close the contacts 224 and re-energize the low speed winding 228. The pattern-supporting frame will then continue to rotate in the reverse direction, but at an abruptly-reduced speed.

As the pattern-supporting frame approaches its initial position, the cam 404 will move into engagement with the actuator of the limit switch 322, thereby re-opening the contact 325 and re-closing the contact 324. Thereupon, the coil 262 will become de-energized and will permit the contacts 214 to re-open and halt further rotation of the pattern-supporting frame in the reverse direction. Also, the coil 356 will become de-energized and permit the contacts 352 to re-open and the contacts 354 to re-close. At this time, the pattern-supporting frame will come to rest squarely in its initial position, as braked by the brake 233.

As the contact 324 re-closed, it completed a circuit through the solenoid 326 of the solenoid-operated air valve which controls the movement of the movable oven of the molding machine. That air valve will supply compressed air to the cylinder that causes the oven to move down into proximity to the shell mold on the heated pattern; and that oven will supply the heat that is needed to cure that shell mold. At the end of the curing period, the timer will open the contacts 292 and de-energize the solenoid 326. Thereupon compressed air and a spring will return the oven to its raised position.

Immediately after the contacts 292 open, the timer will open the contacts 288 and de-energize the parallel-connected motor 282 and clutch winding 284. As that winding becomes de-energized, the contacts 288, 290 and 292 will return to their initial positions.

At this time, the molding machine in the above example will have completed one full cycle of operation; and during that cycle of operation the pattern-supporting frame rotated approximately three hundred sixty degrees in the forward direction, the investment box deposited admixed sand and binder on the pattern carried by that frame, the vibrator made sure that the admixed sand and binder conformed closely to the surface of that pattern, the pattern-supporting frame remained in its rotated position long enough to enable heat from the pattern to form the shell mold, the pattern-supporting frame then rotated approximately three hundred sixty degrees in the reverse direction, the oven moved down adjacent the shell mold to cure that shell mold, that oven then returned to its raised position, and the timer re-set itself. The first three hundred twenty-five degrees of rotation of the pattern-supporting frame in the forward direction were accomplished at high speed. The remaining thirty-five degrees of rotation of the pattern-supporting frame in the forward direction and the first thirty-five degrees of rotation of the pattern-supporting frame in the reverse direction were accomplished at low speed. The next two hundred ninety degrees of rotation of the pattern-supporting frame in the reverse direction were accomplished at high speed, but the final thirty-five degrees of rotation of the pattern-supporting frame in the reverse direction were accomplished at low speed. This is desirable because it makes it possible for the molding machine, irrespective of the braking forces applied by the magnetic brake 233, to bring the pattern-supporting frame to rest in a precisely predetermined rotated position and in a precisely predetermined initial position. At the conclusion of its cycle of operation, the molding machine will remain in its at-rest position until the push button 266 is again pressed. When that push button is again pressed, the molding machine will automatically pass through another cycle of operation.

The fact that the pattern-supporting frame is rotated at low speed during the latter part of its rotation in the forward direction and during the initial and latter parts of its rotation in the reverse direction does not unduly lengthen the cycle of operation of the molding machine. Specifically, that pattern-supporting frame can accomplish three hundred sixty degrees of rotation in the forward direction and three hundred sixty degrees of rotation in the reverse direction in less than three seconds.

The present disclosure includes that contained in the appended claims, as well as that of the forgoing description.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. In a motor control circuit for driving a load along a path from an initial position toward a second position and is brought to rest in said second position,
   a two-speed motor that has a high speed winding and a low speed winding and connected to move said load,
   a brake connected to said motor,
   said brake applying braking forces to and halting movement of said motor and load whenever said high speed winding and said low speed winding are deenergized,
   said brake freeing said motor and load for rotation whenever either said high speed winding or said low speed winding is energized,
   first limit switch means adjacent said initial position of said load,
   further limit switch means adjacent said second position of said load,
   means connecting said first limit switch means for energizing said low speed winding of said motor as said load starts movement from said initial position and then energizing said high speed winding and de-energizing said low speed winding as said load moves further toward said second position,
   and means connecting said further limit switch means for de-energizing said high speed winding and energizing said low speed winding of said motor as said load approaches said second position, and then de-energizing said low speed winding to permit said brake to bring said load to rest as said load reaches said second position.

2. In a motor control circuit for driving a load in first and second opposite directions along a path from an initial position toward a second position and is brought to rest in said second position and is then again moved toward said initial position and is brought to rest in said initial position,
   a two-speed reversible motor that has a high speed winding and a low speed winding and that is connected to move said load in said first and second directions,
   first limit switch means adjacent said initial position of said load,
   further limit switch means adjacent said second position of said load,
   and a timer,
   said first limit switch means energizing said high speed winding of said motor as said load starts movement from said initial position,
   said further limit switch means de-energizing said high speed winding and energizing said low speed winding of said motor as said load approaches said second position and then de-energizing said low speed winding to bring said load to rest as said load reaches said second position,
   said timer initiating movement of said load toward said initial position in the reverse direction by said motor,
   said further limit switch means energizing said high speed winding as said load again moves toward said initial position,
   and said first limit switch means de-energizing said high speed winding and energizing said low speed winding as said load approaches said initial position and then de-energizing said low speed winding to bring said load to rest as said load reaches said initial position.

3. In a motor control circuit for driving a load along a path from an initial position toward a second position and is brought to rest in said second position and is then again moved toward said initial position and is brought to rest in said initial postion,
   a two-speed motor that has a hgh speed winding and a low speed winding and connected to move said load,
   a brake connected to said motor,
   said brake applying braking forces to and halting movement of said motor and load whenever said high speed winding and said low speed winding are de-energized,
   said brake freeing said motor and load for rotation whenever either said high speed winding or said low speed winding is energized,
   first limit switch means adjacent said initial position of said load,
   further limit switch means adjacent said second position of said load,
   means connecting said first limit switch means for energizing said high speed winding of said motor as said load starts movement from said initial position,
   means connecting said further limit switch means for de-energizing said high speed winding and energizing said low speed winding of said motor as said load approaches said second position, and then de-energizing said low speed winding to permit said brake to bring said load to rest as said load reaches said second position,
   means energizing said low speed winding and initiating movement of said load toward said initial position by said motor,
   said further limit switch means energizing said high speed winding and de-energizing said low speed winding as said load again moves toward said initial position,
   and said first limit switch means de-energizing said high speed winding and energizing said low speed winding as said load approaches said initial position and then de-energizing said low speed winding to permit said brake to bring said load to rest as said load reaches said initial position.

4. In a motor control circuit for driving a load along a path from an initial position toward a second position and is brought to rest in said second position and is then again moved toward said initial position and is brought to rest in said initial position,
   a two-speed motor that has a high speed winding and a low speed winding and connected to move said load,
   a brake connected to said motor,
   said brake applying braking forces to and halting movement of said motor and load whenever said high speed winding and said low speed winding are de-energized,
   said brake freeing said motor and load for rotation whenever either said high speed winding or said low speed winding is energized,
   first limit switch means adjacent said initial position of said load,
   further limit switch means adjacent said second position of said load,
   and a timer,
   said first limit switch means energizing said high speed winding of said motor as said load starts movement from said initial position,
   said further limit switch means de-energizing said high speed winding and energizing said low speed winding of said motor as said load approaches said second position, and then de-energizing said low speed winding to permit said brake to bring said load to rest as said load reaches said second position, said timer energizing said low speed winding and initiating movement of said load from said second position toward said initial position by said motor, said further limit switch means energizing said high speed winding and de-energizing said low speed winding as said load again moves toward said initial position, and said first limit switch means de-energizing said high speed winding and energizing said low speed winding as said load approaches said initial position and then de-energizing said low speed winding to permit said brake to bring said load to rest as said load reaches said initial position.

5. In a motor control circuit for driving a load in first and second opposite directions along a path from an initial position toward a second position and is brought to rest in said second position and is then again moved toward said initial position and is brought to rest in said initial position, a two-speed reversible motor that has a high speed winding and a low speed winding and connected to move said load in said first and second directions, a brake connected to said motor, said brake applying braking forces to and halting movement of said motor and load whenever said high speed winding and said low speed winding are de-energized, said brake freeing said motor and load for rotation whenever either said high speed winding or said low speed winding is energized, first limit switch means adjacent said initial position of said load, further limit switch means adjacent said second position of said load, and a timer, said first limit switch means energizing said high speed winding of said motor as said load starts movement from said initial position, said further limit switch means de-energizing said high speed winding and energizing said low speed winding of said motor as said load approaches said second position, and then de-energizing said low speed winding to permit said brake to bring said load to rest as said load reaches said second position, said timer initiating movement of said load toward said initial position in the second direction by said motor, said further limit switch means energizing said high speed winding as said load again moves toward said initial position, and said first limit switch means de-energizing said high speed winding and energizing said low speed winding as said load approaches said initial position and then de-energizing said low speed winding to permit said brake to bring said load to rest as said load reaches said initial position.

6. In a motor control circuit for driving a load in first and second opposite directions along a path from an initial position toward a second position and is brought to rest in said second position and is then again moved toward said initial position and is brought to rest in said initial position, a two-speed reversble motor that has a high speed winding and a low speed winding and connected to move said load in said first and second directions, a brake connected to said motor, said brake applying braking forces to and halting movement of said motor and load whenever said high speed winding and said low speed winding are de-energized, said brake freeing said motor and load for rotation whenever either said high speed winding or said low speed winding is energized, first limit switch means adjacent said initial position of said load, further limit switch means adjacent said second position of said load, and a timer, means connecting said first limit switch means for energizing said high speed winding of said motor as said load starts movement from said initial position, means connecting said further limit switch means for de-energizing said high speed winding and energizing said low speed winding of said motor as said load approaches said second position, and then de-energizing said low speed winding to permit said brake to bring said load to rest as said load reaches said second position, said timer holding said load in said second position for a predetermined period of time, said timer thereafter energizing said low speed winding and initiating movement of said load toward said initial position in the second direction by said motor at said low speed, said further limit switch means energizing said high speed winding and de-energizing said low speed winding as said load again moves toward said initial position, and said first limit switch means de-energizing said high speed winding and energizing said low speed winding as said load approaches said initial position and then de-energizing said low speed winding to permit said brake to bring said load to rest as said load reaches said initial position.

References Cited

UNITED STATES PATENTS

| 1,894,815 | 1/1933 | Biggert et al. | 318—258 |
| 2,780,153 | 2/1957 | White et al. | 318—286 XR |
| 2,941,133 | 6/1960 | Springer et al. | 318—256 |

BENJAMIN DOBECK, *Primary Examiner.*